June 29, 1965  E. T. PRIEBE  3,191,498
REAR VIEW MIRROR
Filed May 25, 1961  2 Sheets-Sheet 1
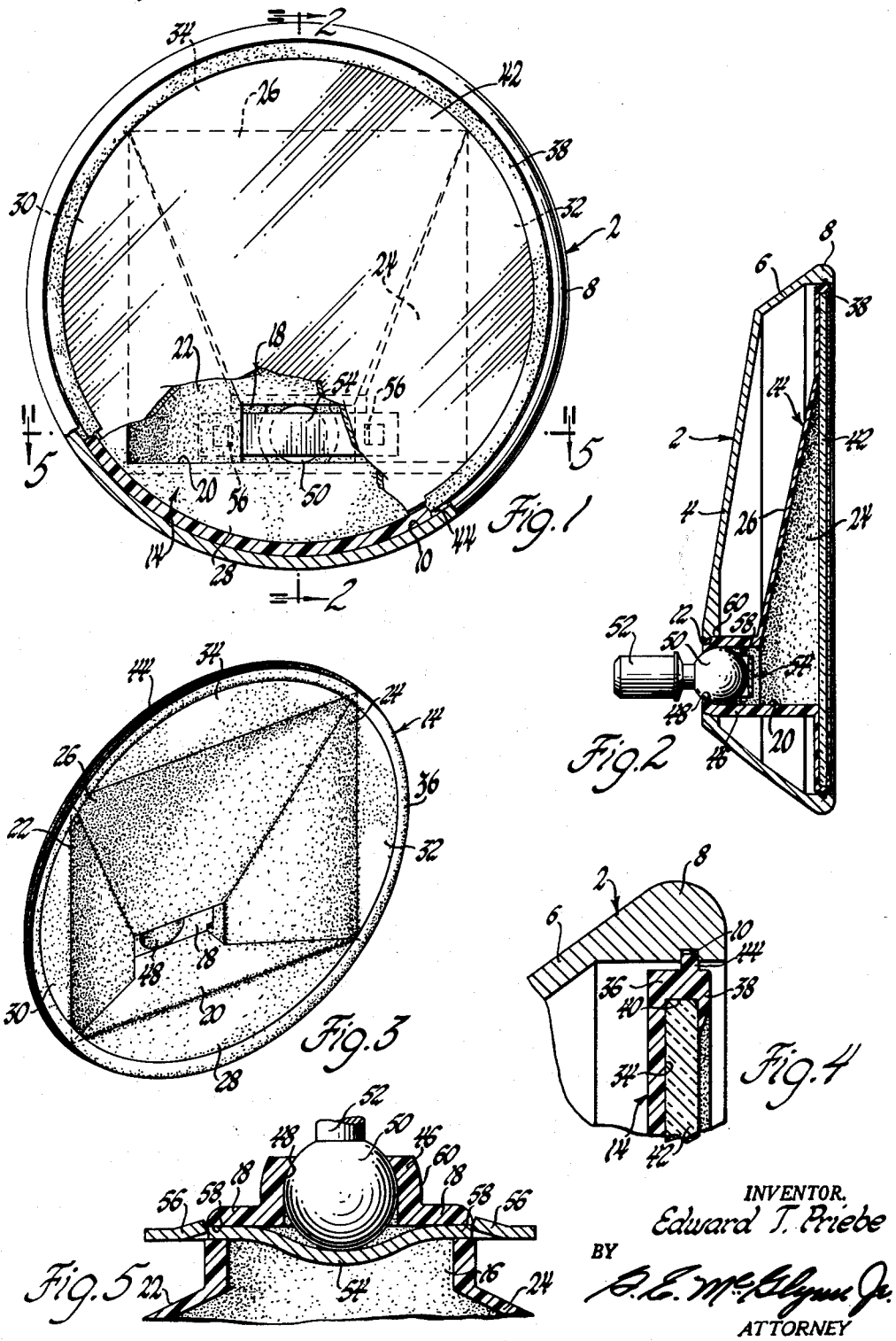
INVENTOR.
Edward T. Priebe
BY
ATTORNEY

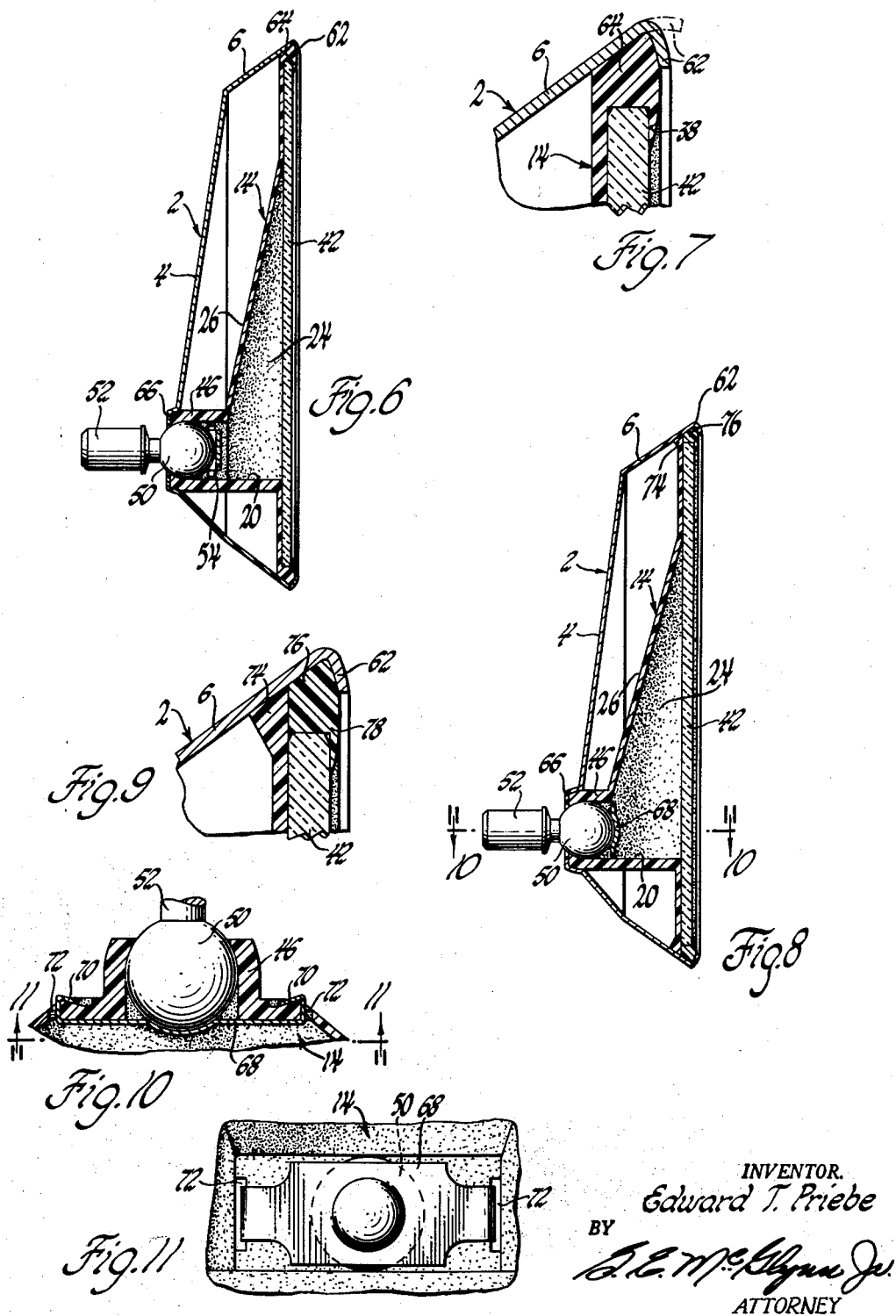

United States Patent Office 3,191,498
Patented June 29, 1965

3,191,498
REAR VIEW MIRROR
Edward T. Priebe, Roseville, Mich., assignor to General Motors Corporation, Detroit, Mich., a corporation of Delaware
Filed May 25, 1961, Ser. No. 112,619
1 Claim. (Cl. 88—98)

This invention pertains to mirror assemblies and, in particular, to rear view mirror assemblies of the type employed on automotive vehicles.

Automotive rear view mirrors of the type to which the present invention pertains typically comprise a dished metal mirror case including an open front or face and a socket construction opposite thereto universally pivotally receiving a ball member secured to a mounting or attaching stud utilized to support the mirror case in the desired position on the vehicle. A mirror element is suitably retained in the mirror case to close the open front face thereof, and a suitable backing material or gasket normally overlies the rear surface of the mirror element to protect the latter, particularly when the reflecting coating of the mirror element is applied to this surface.

It is a principal object and feature of this invention to provide an improved rear view mirror assembly of the type employed on automotive vehicles comprising a mirror case and a mirror support or retainer subassembly which may be easily removably mounted within the mirror case.

It is yet another object and feature of this invention to provide a rear view mirror assembly of the type aforementioned characterized by a mirror support or retainer subassembly including a protective backing surface for a mirror element and a socket construction universally pivotally mounting the ball member of a ball stud type attaching or supporting member utilized to mount the mirror assembly on a vehicle.

It is yet another object and feature of this invention to provide a rear view mirror assembly of the type aforementioned in which the mirror support or retainer subassembly including the mirror backing surface and the ball stud attaching member may be readily removably mounted within a mirror case.

It is yet another object and feature of this invention to provide a rear view mirror assembly comprising a mirror case, a mirror support or retainer member including a backing surface for a mirror element and a socket universally pivotally receiving a ball stud type attaching member, and a mirror element, and in which the mirror element is readily removably mountable within the mirror support or retainer to form a subassembly therewith and such subassembly being likewise readily removably mountable within the mirror case.

These and other objects, features and advantages of the invention will become more apparent hereinafter as the description of the invention proceeds, and in which reference is made to the drawings in which;

FIGURE 1 is a front elevation, partially broken away to illustrate certain details, of a preferred embodiment of the invention;

FIGURE 2 is a view taken on line 2—2 of FIGURE 1;

FIGURE 3 is a perspective view of the mirror support or retainer member forming a part of the construction of FIGURES 1 and 2;

FIGURE 4 is an enlarged fragmentary view of FIGURE 2 illustrating certain details of the invention;

FIGURE 5 is an enlarged view taken on line 5—5 of FIGURE 1;

FIGURE 6 is a view corresponding generally to FIGURE 2, but showing another embodiment of the invention;

FIGURE 7 is an enlarged fragmentary view of FIGURE 6 illustrating certain details thereof;

FIGURE 8 is a view corresponding generally to FIGURES 2 and 6, but illustrating a third embodiment of the invention;

FIGURE 9 is an enlarged fragmentary view of FIGURE 8 illustrating certain details thereof;

FIGURE 10 is an enlarged view taken on line 10—10 of FIGURE 8; and

FIGURE 11 is a view taken on line 11—11 of FIGURE 10.

Referring now to FIGURES 1 through 5 and one preferred embodiment of the invention, the numeral 2 generally indicates a dished metal mirror case, in this case a casting, comprising a rear wall portion 4 and a forwardly and outwardly sloping annular side wall portion 6 terminating in an annular peripheral bead or edge 8 defining the usual open front face of the mirror case. An annular radially directed locking groove 10 is formed in the peripheral bead or edge of the mirror case, while an axially rearwardly curved annular seating surface 12 defines an aperture in the rear wall of the mirror case opposite the front face thereof.

The numeral 14 generally indicates an integral mirror retainer or support member, preferably formed of a suitable mirror backing material such as a polyvinyl chloride, comprising a base 16 including a rear wall 18, a main body portion including the horizontal forwardly extending lower wall 20, forwardly and outwardly extending side walls 22 and 24 and forwardly and upwardly extending upper wall 26. Each of the body portions 20, 22, 24, and 26 of the mirror support terminate in substantially identical arcuate segments or seats 28, 30, 32 and 34, respectively, which extend radially outwardly therefrom in a substantially common plane. A continuous annular peripheral bead 36 extends about the peripheries of the aforementioned segments, and includes an axially forwardly spaced radially inwardly directed flexible lip 38 defining a continuous annular groove 40 on the mirror retainer in which the peripheral edge of a conventional mirror element 42 is supported. As will be apparent, the rear surface of the mirror element is supported by the respective arcuate segmental surfaces aforedescribed. A flexible annular locking rib 44 projects radially outwardly from the bead 36 of the support 14 and is removably engaged or seated within the annular locking groove 10 on the edge of the mirror case.

A socket 46 projects rearwardly from the rear wall 18 of the mirror support or retainer, and is suitably curved to form a spherical bearing surface 48 receiving the ball member 50 for universal pivotal adjustment relative thereto, the ball member being rigidly secured to the usual attaching or mounting stud 52 adapted to mount the entire mirror assembly to a suitable support in a well known manner. A spring metal band includes an intermediate portion 54 engaging the head of ball member 50 to urge the latter into engagement with the bearing surface 48, and retaining barbs 56 at each end thereof which mount the band in the base of the mirror support 14. As will be apparent from the drawings, the barbs 56 are yieldable upon insertion through suitable slots 58 formed in opposite walls of the base of the mirror retainer, and then spring out to the position shown in FIGURE 5 to retain the spring metal band in position on the support 14. The socket 46 also includes an external axially curved annular bearing surface 60 corresponding generally to the curvature of the seating surface 12 on the mirror case so as to nest therewith as shown in FIGURE 2 upon insertion of the mirror support through the open front face of the mirror case.

As is illustrated particularly in FIGURES 2 and 4 and as will now be apparent, the mirror support 14 may be installed within the mirror case 2 by inserting it through the open front face of the latter until such time as the bearing surface 60 on the socket 46 seats against the surface 12 on the mirror case, thereby limiting further movement of the socket rearwardly of the case. In so inserting the mirror support, the attaching member 52 passes through the aperture in the mirror case defined by the seating surface 12, and is in positon for subsequent installation on the vehicle. After the socket is seated in this manner within the case, the annular locking rib 44 is pressed further into the open front face of the case until it seats within the groove 10 thereon. In this regard, the relative dimensions of the mirror case, support member 14 and the cooperating parts thereon are such that the support member 14 is at least slightly compressed by such installation procedure, thereby insuring that the socket 46 remains firmly seated against the surface 12 of the mirror case. Thereafter, the mirror element 42 may be installed within the groove 40 on the mirror support and seated against the arcuate backing surfaces 28, 30, 32 and 34 merely by manipulating the yieldable lip 38 as will be obvious. On the other hand, if desired, the mirror element may be installed in this manner on the mirror support or retainer prior to installation of the latter in the mirror case as aforedescribed. In any event, since the diameter of the mirror element 42 is less than that of the mirror case bead 8 defining the open front face of the mirror case, it will be readily apparent that a damaged mirror element may be readily removed from the assembly and a replacement therefor readily mounted on the mirror support member merely by manipulating the yieldable retaining lip 38. Similarly, the entire subassembly consisting of the mirror support 14, mirror element 42 and the ball stud attaching member may be readily removed from the mirror case merely by disengaging the locking rib 44 from the locking groove 10. Upon installation of the attaching stud 52 on its fixed support on the vehicle, the entire mirror case 2 and retainer 14 including the mirror element 42 may be universally adjusted about the ball member 50.

Reference will now be made to FIGURES 6 and 7 showing a second embodiment of the invention, like numerals being employed to indicate parts corresponding to those previously described. In the embodiment of FIGURES 6 and 7, the dished-shaped mirror case 2 is formed of sheet metal rather than being a casting as previously described, and differs from the previously described embodiment in that the forward peripheral edge 62 of the side wall 6 is spun radially inwardly as indicated in FIGURE 7 to form a retaining shoulder for the yieldable peripheral bead 64 of the mirror support or retainer 14. Furthermore, the aperture in the rear wall 4 of the mirror case is defined by a depressed annular wall 66 which receives the socket 46 of the mirror support member 14. Finally, the peripheral bead 64 of the mirror support 14 has a sloping peripheral surface corresponding to the slope of the side wall 6 of the mirror case so that these two members firmly nest together upon insertion of the mirror support into the mirror case to dispose the yieldable bead 64 behind the peripheral retaining shoulder 62 at the front face of the mirror case.

Again, the mirror element 42 may be replaced merely by manipulating the yieldable lip 38 of the mirror support, while the entire mirror support subassembly may be removed from the mirror case merely by drawing the yieldable bead 64 past the peripheral locking shoulder 62 of the mirror case.

Referring now to FIGURES 8 through 11 and a third embodiment of the invention, like numerals are employed to indicate parts corresponding to those previously described with respect to the embodiment of FIGURES 6 and 7. In this embodiment, a slightly different spring metal band 68 is utilized to maintain the ball member 50 within the socket 46. Thus, the metal band 68 includes an intermediate portion engaging the head of the ball member 50 and retaining it in position in the socket 46, two oppositely disposed terminal portions 70 which, upon initial installation on the mirror support 14, extend at right angles to the intermediate portion of the metal band for insertion through corresponding slots 72 in the rear wall of the mirror support. Thereafter, these terminal portions are bent inwardly as illustrated in FIGURE 10 to firmly engage the rear surface of the rear wall of the support to hold the spring metal band in position. This type of construction is preferred in the instance in which the mirror support or retainer member 14, rather than being made of one integral piece as previously described, is made of two pieces which are then mated in the plane of section line 2—2 of FIGURE 1 and held together by the band aforedescribed.

This embodiment further differs from that of FIGURES 6 and 7 in that the mirror support or retainer 14 includes a flexible peripheral bead 74 including a sloping peripheral surface conforming with the slope of the side wall 6 of the mirror case, and a separate annular flexible retaining ring 76 is similarly shaped to conform with the slope of the case side wall 6 and includes a flexible lip 78 spaced forwardly from the arcuate backing surfaces of the mirror support 14. As will be apparent, the rear surface of the retaining ring is held flush against the backing surfaces of the support 14 by the locking shoulder 62.

As in the other embodiments described above, the mirror element 42 may be easily replaced merely by manipulating the yieldable retaining lip 78, and the entire mirror support or retainer subassembly 14 including the ball stud attaching member may be removed from the mirror case merely by removing the yieldable retaining ring 76 from behind the peripheral locking shoulder 62 on the mirror case and then removing the subassembly from the open front face of the case.

While three forms of the invention have been shown and described, other forms will now be apparent to those skilled in the art. Therefore, the embodiments shown in the drawings are merely for illustrative purposes, and are not intended to limit the scope of the invention which is defined by the claim which follows.

I claim:

A rear view mirror assembly comprising a mirror support made from a flexible material and including a front flat seating face for a mirror element and a rear wall spaced therefrom, a mirror element, means including an integral flexible peripheral lip about said seating face removably holding said mirror element against said face, a socket integral with the rear wall of said mirror support, a ball member universally pivotally supported within said socket and including a mounting stud extending beyond said socket, a dished mirror case including a rear wall and an open front to receive said mirror support, an aperture in the rear wall of said mirror case, a socket seat on the rear wall of said mirror case surrounding said aperture, said mirror support being insertable through the open front of said mirror case to engage said socket with said seat with said mounting stud extending through said aperture and said mirror element closing the open front of said mirror case, cooperatively engageable means on said mirror case and said mirror support to removably retain the latter within said mirror case, said last mentioned means comprising an annular groove formed in said case, and a flexible annular locking rib radially projecting from said mirror support into said groove.

References Cited by the Examiner

UNITED STATES PATENTS

| | | | |
|---|---|---|---|
| 2,112,656 | 3/38 | Ponce | 88—98 X |
| 2,498,065 | 2/50 | Budreck | 88—98 |
| 2,613,575 | 10/52 | Falge | 88—98 |
| 2,706,931 | 4/55 | Morgenstern | 88—96 X |
| 2,789,464 | 4/57 | Williams | 88—96 X |

FOREIGN PATENTS 736,382 9/55 Great Britain.

FREDERICK M. STRADER, *Primary Examiner.*

WILLIAM MISIEK, JEWELL H. PEDERSEN, *Examiners.*